United States Patent [19]

Nazimek

[11] 4,243,928
[45] Jan. 6, 1981

[54] VOLTAGE REGULATOR FOR VARIANT LIGHT INTENSITY PHOTOVOLTAIC RECHARGING OF SECONDARY BATTERIES

[75] Inventor: Kenneth Nazimek, Flemington, N.J.

[73] Assignee: Exxon Research & Engineering Co., Florham Park, N.J.

[21] Appl. No.: 42,790

[22] Filed: May 29, 1979

[51] Int. Cl.³ .............................................. H02J 7/00
[52] U.S. Cl. ............................................ 320/2; 320/61; 323/223; 323/906
[58] Field of Search ............... 320/39, 40, 26, 1, 53; 323/8, 15; 58/23 BA, 23 C

[56] References Cited
U.S. PATENT DOCUMENTS

| | | | |
|---|---|---|---|
| 3,480,789 | 11/1969 | Binckley et al. | 323/8 X |
| 3,600,599 | 8/1971 | Wright et al. | 320/53 X |
| 3,696,286 | 10/1972 | Ule | 320/40 X |
| 3,731,474 | 5/1973 | Tsuruishi . | |
| 3,740,636 | 6/1973 | Hogrefe et al. | 320/35 X |
| 3,896,368 | 7/1975 | Rym | 323/8 |
| 3,921,049 | 11/1975 | Mellors . | |
| 3,979,656 | 9/1976 | Takeda et al. . | |

FOREIGN PATENT DOCUMENTS 1424383 2/1976 United Kingdom .................... 307/150

OTHER PUBLICATIONS

RCA Technical Notes Tn No. 783, Sep. 25, 1968, "Shunt Type Voltage Regulator", Nekrasov.

*Primary Examiner*—Robert J. Hickey
*Attorney, Agent, or Firm*—Paul E. Purwin

[57] ABSTRACT

A simplified voltage regulator circuit permits varient light intensity photovoltaic recharging of secondary batteries. The regulator circuit electronically shunts serially connected regions of a photovoltaic recharger array to avoid overcharging during periods of high light intensity or full battery charge conditions. The regulator circuitry provides minimal series resistance to the photovoltaic array and requires nominal driving power. The photovoltaic array and the regulator circuitry may comprise discrete components or may share a common substrate body.

9 Claims, 4 Drawing Figures

VOLTAGE REGULATOR FOR VARIANT LIGHT INTENSITY PHOTOVOLTAIC RECHARGING OF SECONDARY BATTERIES

BACKGROUND OF THE INVENTION

The present invention relates to solar battery charging systems and in particular to voltage regulation of photovoltaic recharging of secondary batteries under varient ambient light conditions.

The conventional photovoltaic recharging system is designed to operate within a given insolance range providing a predetermined range of power output. An appropriate array of series and parallel connected photovoltaic cells with known current-voltage characteristics may be constructed to provide the required recharging power for a given range of insolance. Where the maximum value of insolance is ascertainable and the average variance of insolation during the required recharging period is relatively small, the recharging power regulation may be accomplished merely by a judicious selection of the size and number of parallel and the number of serial connected photovoltaic cells. A regulation circuit under such circumstances need only comprise a blocking diode to prevent discharging the secondary battery through the photovoltaic cells. Recharging power would be inherently limited by the capability of the photovoltaic array. However, where the anticipated insolance varies significantly, that is greater than an order of magnitude, and the secondary battery is sensitive to over-voltage charging, cell array design alone will not serve as an efficient power regulating means.

Conventionally, a recharger circuit will be designed to produce the desired recharging power under insolance conditions anticipated during a majority of the rechargers' operation. This type of recharger would typically be designed to optimize the size and number of cells in the array (as opposed to optimizing the use of anticipated ambient light). Such systems are suitable for minor variations in insolance, but if ambient light exposure were to vary significantly, this design would either sacrifice high insolance recharging or would ineffectively contribute to battery recharging at low level illumination. That is to say that the photovoltaic recharger array is typically designed in a manner which would either:

a. Provide sufficient recharging at higher illumination levels, but contribute dimunitive recharging power at room light or similarly low level light intensity; or b. Provide sufficient recharging power at lower illumination levels and none at higher light intensities.

The present invention relates to a simple regulator circuit which provides recharging at illumination levels varying over two orders of magnitude while providing overpotential charging regulation. The invention is of particular utility in recharger devices which rely on room light irradiance recharging yet often are exposed to higher intensities such as direct sunlight, and all irradiance levels in between. Many devices such as calculators, wrist watches, childrens' toys and the like are exposed to such varied light conditions. The present invention provides recharging ability throughout these illumination ranges yet regulates against battery overcharging which may result in the destruction of the battery.

PRIOR ART

Numerous circuits have been taught for voltage and current regulation of photovoltaic rechargers. As exemplified in FIG. 1, these regulator circuits conventionally shunt the entire array when the array voltage or current exceeds the predetermined limit. Examples of such circuits may be found in U.S. Pat. Nos. 3,921,049, 3,979,656 and 3,731,474. These circuits will electrically disable the recharger during high illumination levels to prevent overpotential charging. However, these circuits will not resume battery recharging until either the illumination level is sufficiently low or the voltage of the secondary battery has been reduced. The latter condition will typically occur only at or near the exhaustion of the battery charge. For example, a nickel-cadmium secondary battery will sustain a virtually constant voltage output until about the last one to five percent of the discharge cycle. It is therefore conceivable, in using the prior art circuits, that a secondary battery might be 90% discharged and yet the prior art regulator circuit would prohibit recharging. In contrast, the present invention electrically disables only a portion of the photovoltaic array whenever the battery voltage is at or near its full potential and high illumination level recharging conditions exist. A portion of the array continues to supply recharging power just below the maximum recharging voltage of the battery, maintaining the battery in a fully charged condition.

Others in the art have recognized this problem and have provided for controlled shunting of portions of the recharger array. Examples of such circuits may be found in U.S. Pat. Nos. 3,896,368 and 3,740,636. These circuits were designed for the intended use in spacecraft power systems where component cost and complexity were of secondary concern. These prior art circuits require digitizing of the analog charging signal, computation of charge status, and other complex control circuitry functions. The present invention employs only two active dissipative components to provide efficient varient illumination recharging regulation.

An alternate approach has been to compare the array recharging power to a reference array output. Examples of this approach may be found in U.S. Pat. Nos. 3,600,599 and 3,696,286. The reference array, illuminated at the same light level as the recharger array, operates at an optimal power output. The difference between the output of the reference array and the recharger array is compared to generate an error control signal. This in turn triggers regulator circuitry to direct the electrical shunting or engaging of portions of the recharger array. Again this type of regulator requires a substantially greater number of components than the present invention. A majority of these components are active, power dissipating components. In relatively low power applications such as solar recharged timepiece or calculator batteries, such circuit power requirements may be power consumptively prohibitive. The comparatively simple circuitry of the present invention requires neither reference nor driver circuitry and dissipates nominal power. Furthermore the circuitry is active only during periods of high illumination and is then powered by the very array components which are electronically disabled from the recharging circuit, presenting no power drain on the secondary batteries.

A further example of selective shunting of recharger array sections may be found in U.S. Pat. No. 3,480,789. This reference discloses circuitry for controlling the voltage output of parallel connected power supplies by selectively shunting individual sections of the parallel array whenever the total supply voltage exceeds a reference voltage. Unlike the present invention, the prior art circuit requires reference voltage generating circuitry and comparative circuitry. Furthermore, this disclosure regulates voltage by shunting parallel supply components.

SUMMARY OF THE INVENTION

A simplified voltage regulator circuit permits effective photovoltaic recharging of relatively low power secondary batteries over a broad range of light intensities. Voltage regulation is accomplished by short circuiting a predetermined portion of the photovoltaic array whenever the output voltage of the array exceeds the maximum recharging voltage of the secondary batteries. Low light level recharging is achieved by providing a sufficient number of serially connected photovoltaic cells such that the output voltage of the array, which is logarithmically dependent upon illumination intensity, will be about equal to the necessary charging voltage of the batteries at these lower light intensities. The regulator circuit includes a current switching device, such as a silicon controlled rectifier for example, having its main current conduction path coupled in parallel with a preselected portion of the serially connected array of photovoltaic cells. Of this portion of the array, a predetermined number of the serially connected cells are coupled between the control terminal and the main current conduction path of the switching device. The voltage produced by these cells is proportioned to the output voltage of the array. The number of cells so connected is selected to produce a sufficient voltage at the control terminal of the switching device to permit current conduction through the switch whenever the output voltage of the array exceeds the recharging voltage of the batteries, electrically disabling a portion of the photovoltaic array and reducing the array voltage. The remaining portion of the array, that is, those cells not electrically shunted by the relatively low impedance path provided by the conductive switching device, comprises a sufficient number of photovoltaic cells to provide maximum voltage recharging power to the batteries at the highest anticipated light levels, bright sunshine for example.

A conventionally arranged current blocking diode, interposed between the photovoltaic array, prohibits battery discharge through the array.

In accordance with the present invention, the fabrication of the control circuitry may share a common substrate body with the photovoltaic array.

The regulator circuitry of the present invention minimizes the number of electronic components required to achieve voltage regulation of the photovoltaic array over broad insolance ranges. It additionally minimizes the internal dissipation losses experienced by the array, thereby increasing the efficiency of the photovoltaic recharger.

The coupling arrangement of the array and the voltage regulation circuit provides maximum use of incident light energy in recharging the secondary batteries.

DETAILED DESCRIPTION OF THE INVENTION

Figure 1:
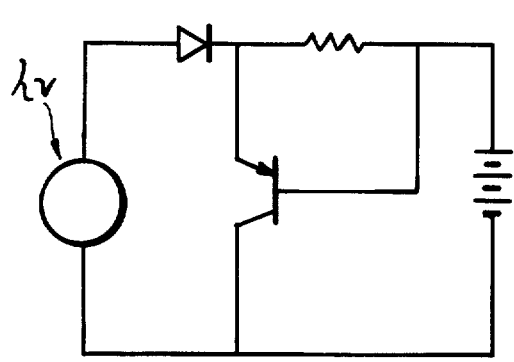
FIG. 1 is a schematic representation of prior art photovoltaic recharging circuitry providing voltage regulation over varient insolance conditions.
Figure 2:
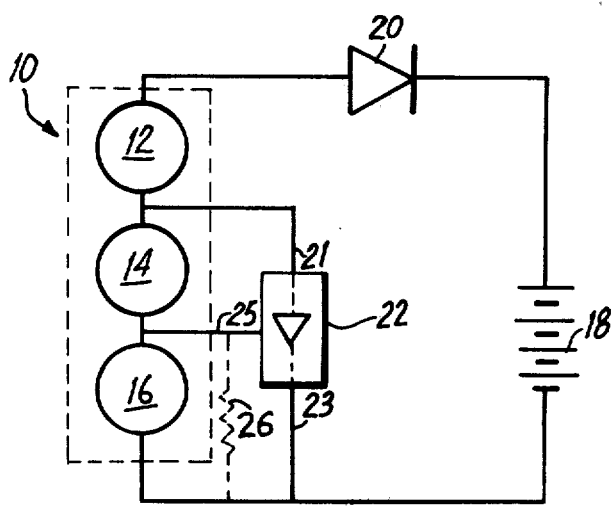
FIG. 2 is a schematic representation of a photovoltaic recharging array including the voltage regulator circuitry of the present invention.

In FIG. 2, a photovoltaic array 10 comprising a plurality of serially connected solar cells, grouped into subarrays 12, 14 and 16, provide photo-recharging to secondary batteries 18. A conventionally arranged blocking diode 20 prohibits current flow from the battery 18 into array 10 which in the absence of said diode may occur whenever the voltage of the battery exceeded that of the array.

It is the basic concept of this invention that photo-recharging is accomplished over varient light intensities while providing over-voltage protection to the secondary batteries. The terminology effective recharging refers to the capability of the photovoltaic array to supply recharging power up to or relatively close to the maximum voltage of the secondary batteries. To provide effective recharging under insolance conditions varying from roomlight (0.3 MW/cm$^2$ average incident energy) to bright sunlight (100 MW/cm$^2$ average incident energy), the recharging system of the present invention includes a sufficient number of serially connected solar cells within array 10 to produce an open circuit voltage, $V_{OC}$, under average roomlight conditions, which preferably is about equal to the sum of the voltage of the secondary batteries in a fully charged condition, $V_{BATT\ MAX}$, plus the voltage required to initiate conduction in the blocking diode 20, $V_{DIODE}$. To prevent the photovoltaic array 10 from overvoltage charging at higher light intensities, that is recharging power supplied at voltages in excess of the maximum recharging voltage of the secondary batteries, a switching device 22 having its main current conduction path coupled in parallel with subarrays 14 and 16 and a control electrode 25 coupled between subarrays 14 and 16 is responsive to the voltage developed across subarray 16 whereupon subarray 16 attaining a predetermined voltage level said switching device is rendered conductive, electrically disabling the solar cell subarrays 14 and 16.

It is to be recognized that switching device 22 is of the type having a control terminal input impedance of sufficiently high value that a negligibly small proportion of array produced photocurrent flows through said control and further through said switching device whenever said device is in a turned off or non-conductive state. That is to say, the current flowing from control electrode 25 to electrode 23 is negligibly small relative to current flowing through the main current conduction path of array 10 whenever switching device 22 is in a nonconductive state.

Switching device 22 preferably is of the type which upon supplying an initial signal to the control terminal of said switch, rendering the switch conductive, the main current conduction path remains in a conductive state until the current flowing in said main conduction path falls below a predetermined value. For example, the current switching device may comprise a silicon controlled rectifier, hereinafter SCR, having its anode to cathode conduction path coupled in parallel relationship with subarrays 14 and 16. Subarray 16, coupled between the cathode and gate terminal of the SCR, provides a voltage to the gate of the SCR which voltage is linearly proportional to the output voltage of the array. The number of serially connected cells within subarray 16 is preselected to provide a sufficient voltage to the gate electrode of the SCR to render the SCR conductive whenever the total array 10 output voltage exceeds the maximum charging voltage for the secondary batteries. That is to say, whenever the ambient lighting condition is of sufficient intensity so as to produce a recharging voltage in excess of the maximum desired charging voltage, a sufficient or threshold voltage is produced at the gate or control terminal of the SCR which, in turn, renders the SCR conductive. In the conductive state, low impedance current conduction through 22 electrically disables subarray 14 and 16 from providing additional voltage to the photovoltaic recharging of battery 18.

Whenever the SCR is in a turned on or conductive state, the output power of subarrays 14 and 16 will be at or near their short circuit current valve. Since the short circuit current of the photovoltaic arrays is linearly proportioned to illumination intensity, a predetermined turn-off current level for the SCR is chosen to correspond to the intensity level at or below which the open circuit voltage which would be produced by the subarrays 12, 14 and 16 is at or below the maximum charging voltage of the secondary battery. However, if switching device 22 if of the type which does not remain conductive in the absence of an appropriate voltage appearing at control terminal 25, (as would be the case when subarrays 14 and 16, in a shorted operational capacity, would supply current at a relatively low voltage) a resistor, shown in phantom in FIG. 2 at 26, will impress a sufficient voltage bias between the control electrode 25 and electrode 23 to maintain the device in a conductive state until the illumination level has fallen sufficiently low to permit recharging by all arrays. During that period when 22 is in a conductive state, photovoltaic charging continues to be provided by subarray 12. The number of serially connected solar cells within subarray 12 is selected to provide an open circuit voltage at high illumination levels which is about equal to the sum of the voltage of secondary batteries in a fully charged condition, $V_{BATT\ MAX}$, plus the voltage required to initiate conduction, $V_{DIODE}$, in the blocking diode 18.

As noted in phantom within switching device 22, current conduction in the turned-on switching device is unidirectional. That is, current flows in the direction from electrode 21 to electrode 23. Therefore, photovoltaic charging by subarray 12 of secondary batteries 18 during that period when switching device 22 is conductive is through subarrays 14 and 16. In this manner, the charging current conduction path is through subarrays 14 and 16, which, under high illumination dissipate only nominal power due to their low series resistance.

Although described as a silicon controlled rectifier device, other current switching semiconductor devices such as metal-oxide-semiconductor devices, commonly referred to as MOSFETs, bipolar transistors and similar third or control terminal controlled current switching devices connected in the aforedescribed circuit in an electrically equivalent manner would operate in the present invention.

In order to present to those skilled in the art, a more definitive explanation of the operation of the present invention, herefollowing is the operation of the invention described for four generalized recharging conditions, low light levels and low battery charge, high light levels and low battery charge, low light levels and high battery charge, and lastly, high light levels and high battery charge. For illustration purposes, the secondary batteries will be assumed to display a full charge voltage of 2.0 volts and have a maximum charging voltage of 2.5 volts.

Figure 3:
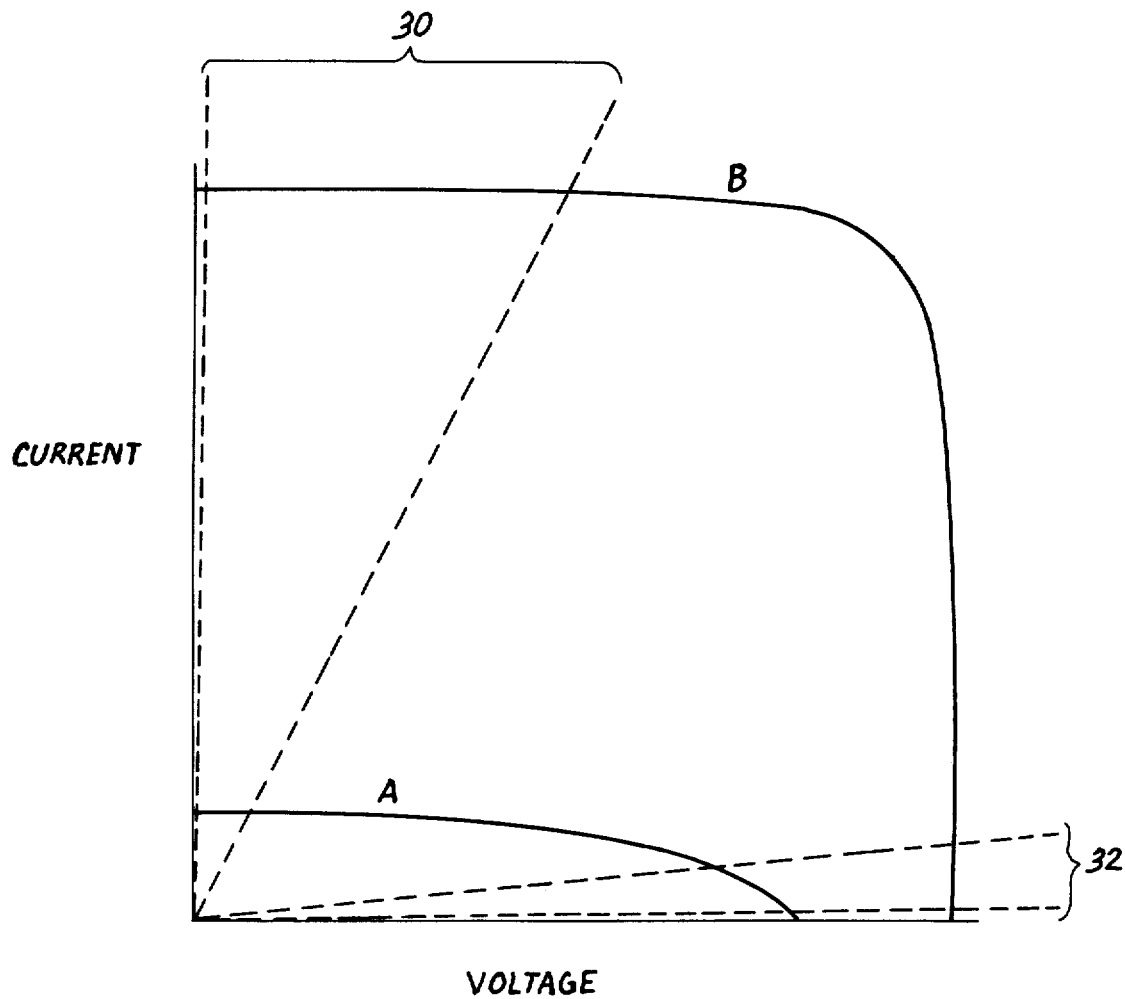
FIG. 3 is a graphic illustration of the power output characteristics of the photovoltaic array of the present invention.

In the first operative condition, that is low light levels and low battery charge, the voltage of solar cell subarray 16 is below the threshold or turn on voltage of the current switching device 22. The overall array 10, comprising serially connected subarrays 12, 14 and 16 contain a sufficient number of serially connected solar cells to provide an open circuit voltage about equal to 2.0 volts at the particular illumination level. However, since the secondary batteries 18 are in an uncharged state, the photovoltaic array 10 will produce charging power at a voltage other than its open circuit voltage. This is illustrated in FIG. 3 as the region along curve A within the area collectively designated 30. For a conventional silicon solar cell having known power output characteristics, a simple mathematical determination of the number of cells in the array 10 may be made for a given illumination intensity level. Although the recharging current produced at lower light levels will be relatively low (dependent upon the area of each serially connected solar cell), this low current charging will continue until a full battery charge is realized. Since open circuit voltage is a logarithmic function of illumination intensity, a relatively large increase in illumination will be required before the switching device is triggered.

The second general operative condition is where the array experiences low light levels and high battery charge level. Current switching device 22 is in a nonconductive state and the full array 10 supplies recharging power at low current levels to maintain the full charge condition of the batteries. The charging output of the array is about equal to the open circuit voltage of the array, thereby low current charging is provided; this current, however, is provided up to a full battery charge potential.

The total array voltage under these conditions is about equal to the full charge battery voltage plus the diode conduction voltage.

This operative condition determines the minimum number of serially connected solar cells in array 10.

The third operative condition is where the recharging system experiences high light levels and low battery charge. As illustrated in FIG. 3, when the secondary batteries are at a low charge level, the photovoltaic array produces charging power along curve B within the region of the power curve collectively designated 30. Therefore, subarray 16, although at high level illumination, does not develop sufficient voltage to trigger the switching device. A high rate of charging will occur under these conditions.

The fourth operative condition is where the recharging system experiences high light conditions and high battery charge. As illustrated in FIG. 3, at 32 the photovoltaic output is of relatively high voltage. Referring to FIG. 2, the voltage developed by subarray 16 under these conditions is sufficient to trigger current switching device 22 which will electrically disable the voltage producing ability of subarrays 14 and 16 reducing the total array voltage equal to or below the maximum charging voltage. The remaining operative subarray will continue to provide charging power, maintaining the full charge status of the secondary batteries 18. This condition determines the maximum number of cells in subarray 12. Subarray 12 must contain a sufficient number of serially connected cells to provide an open circuit voltage under these illumination conditions about equal to the full charge voltage of the secondary batteries, 2.0 volts, plus the diode conduction sustaining voltage $V_{DIODE}$. Additionally, the number of serially connected cells within subarray 16 are determined under these illumination and charge conditions. The voltage produced by subarray 16 exceeds the triggering voltage of switching device 22 when the total array voltage is about equal to the maximum allowed charging voltage, e.g., 25 volts. This will occur whenever there is sufficient light intensity and sufficient battery charge to produce photovoltaic charging power at or above the maximum charging voltage.

Figure 4:
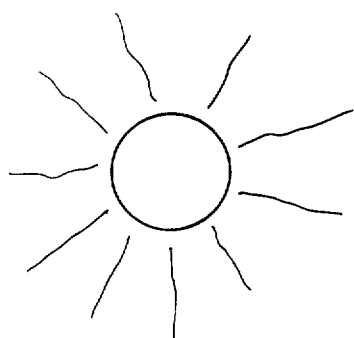
FIG. 4 is a top view in perspective of fabrication of the voltage regulator circuitry sharing a common substrate body with the photovoltaic array.
Figure 4:
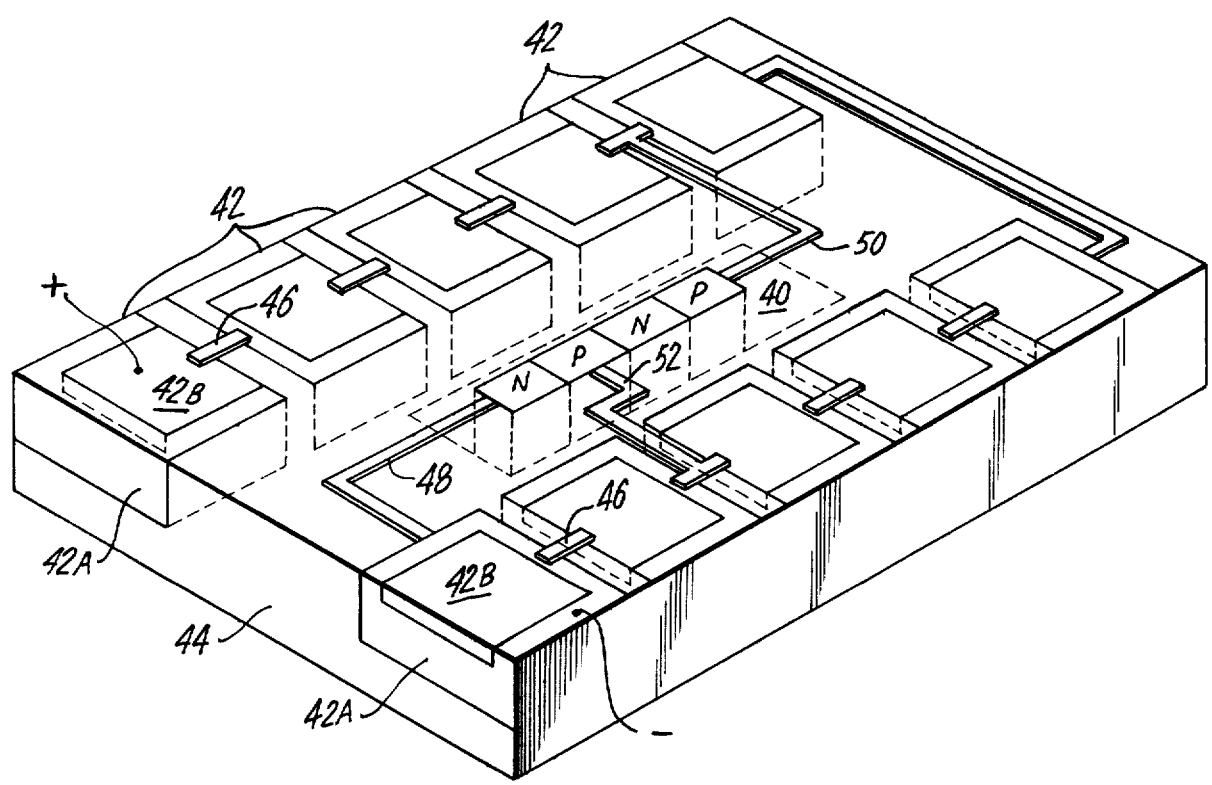

Referring now to FIG. 4, there is shown the recharger system of the present invention embodied in a singular base substrate including both regulator circuitry generally designated 40, and photovoltaic devices generally designated 42. The fabrication process is known in the art. Starting with a high resistance "P" type wafer 44, generally 100 Ω-cm or greater, a plurality of planar segregated regions are doped "N" type, here designated 42A, by conventional techniques of ion implantation or masked diffusion. This doping extends deep into the substrate body. Within these N type regions, a second diffusion (or ion implantation) provides a relatively thin "P" type region, here designated 42B.

As may readily be recognized, this process forms a conventional homojunction photovoltaic device for each said segregated region. Metallic device interconnections 46 provide serial hookup between successive N and P regions of adjoining devices. A switching device 40, here illustrated as an SCR, is constructed in the substrate area between the serially connected rows of photovoltaic devices. A conventional triple diffusion process forms the requisite P-N-P-N junctions. As illustrated the cathode electrode 48 is connected to the negative supply terminal of the array. The anode terminal 50 is connected between the sixth and seventh photovoltaic device. That is, six serially connected photovoltaic devices are connected in parallel with the main current conduction path of the switching device 40. The control terminal 52 is connected between the second and third photovoltaic device. That is, two photocells are connected between the cathode electrode 48 and the control terminal 54.

What is claimed is:

1. A photovoltaic recharging system for voltage regulated charging of secondary batteries under substantially varying light illumination levels, said system comprising:
   at least one secondary battery;
   a recharger array comprising a plurality of photovoltaic cells connected in power supplying relation to said battery and interconnected in a manner providing at least four serially spaced voltage terminals defining at least three subarrays each subarray containing a predetermined number of serially connected photovoltaic cells;
   a blocking diode interposed between said recharger array;
   a switching device having a main current conduction path coupled in parallel with at least two of said subarrays and having at least one subarray coupled between a control terminal of said switching device which is connected to one of said voltage terminals and the main current conduction path of said switching device, said switching device being responsive to a photovoltage developed across said subarray whereupon attaining a predetermined voltage said switching device is rendered conductive, electrically disabling a voltage contribution to battery recharging by the subarrays coupled in parallel with said switching device.

2. The recharging system of claim 1 wherein the number of serially connected solar cells comprises at least one subarray not coupled in parallel relationship with the main current conduction path of said switching device is preselected to provide an open circuit photovoltage under a maximum anticipated illumination level about equal to a maximum battery recharging voltage plus a voltage required to initiate current conduction through said blocking diode.

3. The recharging system of claim 1 wherein the number of serially connected photovoltaic cells comprising said recharger array is determined by dividing a full charge voltage of said secondary battery plus a voltage required to initiate current conduction through said blocking diode by the voltage produced by an individual photovoltaic device at a roomlight illumination level.

4. The recharging system of claim 1 wherein said voltage which renders the switching device conductive is further characterized as the photovoltage developed by the serially connected photovoltaic cells connected between the control terminal of said switching device and the main current conduction path of said switching device when the photovoltage of the entire recharger array is equal to a maximum battery charging voltage plus a voltage sufficient to initiate current conduction through the blocking diode.

5. The recharging system of claim 1 wherein said secondary battery comprises a lithium-titanium disulfide battery having a fully charged voltage of 2.1 and a maximum charging voltage of 2.6.

6. The recharging system of claim 1 wherein said photovoltaic cells comprise silicon solar cells characterized as having an open circuit voltage of about 0.5 volts when illuminated with sunlight having an intensity of about 100 mw/cm$^2$.

7. The recharger system set forth in claim 2 wherein said maximum anticipated illumination level is sunlight of an intensity about equal to 100 mw/cm$^2$.

8. The recharger system set forth in claims 6 or 7 wherein said recharger array comprises 10 serially connected silicon solar cells.

9. The recharger system set forth in claim 1 wherein said switching device comprises a silicon controlling rectifier.

* * * * *